United States Patent [19]
Fels

[11] 3,935,584
[45] Jan. 27, 1976

[54] DEVICE FOR HANDLING PHOTOGRAPHIC FILM BETWEEN A CASSETTE AND AN EXPOSURE REPRODUCTION APPARATUS

[75] Inventor: Werner Fels, Kiel, Germany
[73] Assignee: Rudolf Hell GmbH, Germany
[22] Filed: July 12, 1974
[21] Appl. No.: 488,254

Related U.S. Application Data
[62] Division of Ser. No. 335,956, Feb. 26, 1973.

[30] Foreign Application Priority Data
Feb. 29, 1972 Germany.......................... 2209515

[52] U.S. Cl............................... 354/214; 354/181
[51] Int. Cl.² ........................................ G03B 1/00
[58] Field of Search ................ 354/181, 214; 355/3

[56] References Cited
UNITED STATES PATENTS
| | | | |
|---|---|---|---|
| 1,998,324 | 4/1935 | Lloyd.............................. | 354/214 |
| 3,653,309 | 4/1972 | Ochiai............................. | 354/181 |
| 3,706,489 | 12/1972 | Moxness........................... | 355/3 |

Primary Examiner—John M. Horan
Attorney, Agent, or Firm—Hill, Gross, Simpson, Van Santen, Steadman, Chiara & Simpson

[57] ABSTRACT

A device for handling photographic film between a holder or cassette and an exposure reproduction apparatus including a drum, wherein the cassette is arranged to be supported with an opening therein registering with an opening in a housing supporting film exposure means, film supported in the cassette being transferred through the aligned openings into the housing and into engagement with the supporting means to facilitate exposure of the film within the housing. A rockably mounted film supporting frame in the cassette is movable through the openings to place the film in mounted relation on an exposure drum within the housing, by means of aligned film supporting pins on the frame and on the drum. Manually operable driving and control means are provided on and in the housing for actuating and controlling both the cassette film frame and the exposure drum as well as stripping means whereby after exposure the exposed film is returned to the cassette.

22 Claims, 7 Drawing Figures

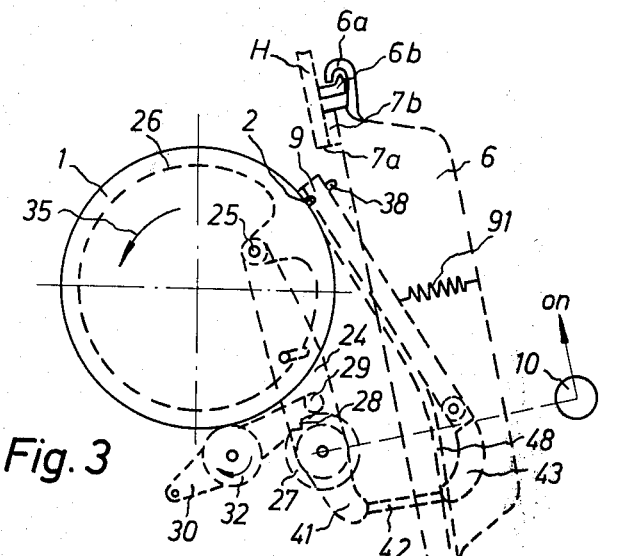
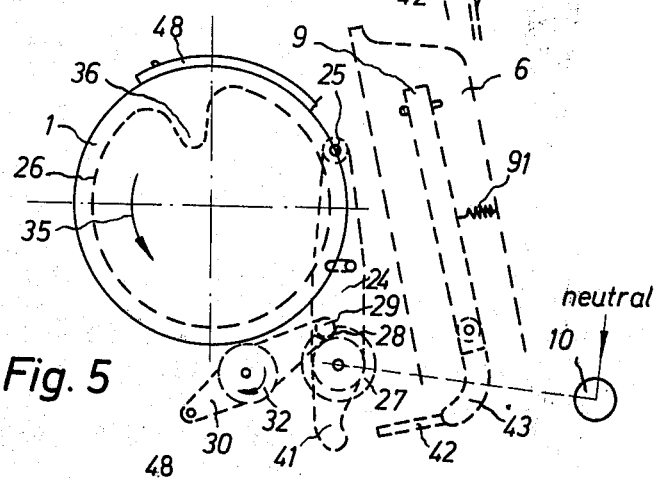
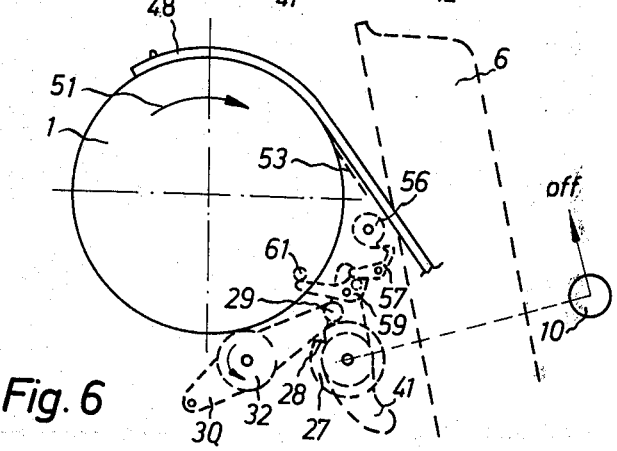

DEVICE FOR HANDLING PHOTOGRAPHIC FILM BETWEEN A CASSETTE AND AN EXPOSURE REPRODUCTION APPARATUS

This is a division, of application Ser. No. 335,956, filed Feb. 26, 1973.

This invention relates to means for transferring photographic film between a cassette and an exposure drum of exposure reproduction apparatus.

An apparatus for producing reproductions, such as for image transfer or for effecting color separation for multi-color printing, and utilizing a rotating recording or exposure drum, commonly employs film material mounted upon the drum. Exposure of the film material during the reproduction process is effected by means of a light beam. Hence there is the problem of application of the unexposed film material and subsequent removal of the exposed film material with respect to the drum.

In most prior apparatus, the film-supporting drum is arranged fixedly in a lightproof housing and the film can be mounted on and removed from the drum only through a closure in the housing while the space surrounding the apparatus is maintained dark. This is a drawback and is time-consuming because the film must be transferred manually and the drum and the apparatus must therefore be installed in a darkroom or within a dark tent or other enclosure.

Even where the film material is transported in a cassette, the problem has persisted due to the heretofore necessity for transferring the film material manually in a darkroom. Such transfer of the film material is a drawback. For proper results, precision in coupling the film material to the drum is desirable but because the film material is generally attached manually with the aid of adhesive tape or mounting brackets on the drum, many errors in applying the film material to the drum may result in failure due to separation of the material from the drum due to centrifugal forces in operation, or at least during rotation of the drum as is customary.

Heretofore transfer of photographic material from a cassette into a development system has been practiced. Such cassettes are utilized for X-ray films and comprise a flat, dish-like container for receiving the film sheet with a hinged closure normally closing the cassette lightproof and being adapted to open when the cassette is mounted in the developing apparatus for removal of the film which is effected by actuation of a hand crank at the cassette or by means of friction rollers which become effective during insertion of the cassette into the developing apparatus and which are actuated by a drive provided in the apparatus. In such cassettes, however, the film material is not removed from the cassette for exposure purposes because due to the property of X rays it is possible to expose the film within the cassette. While it is true that in the developing apparatus the film is automatically transferred from the cassette, such transfer is without any precision since the film is merely guided into a developing bath. Such cassettes are not, however, intended for nor suitable for accomplishing transfer of the film material to and between the cassette and an exposure drum.

An important object of the present invention is to overcome the foregoing and other disadvantages, deficiencies, inefficiencies, shortcomings and problems in prior methods and apparatus and to attain important new and improved advantages in the handling of photographic film material in respect to drum exposure of such material.

Another object of the invention is to provide a new and improved means for transferring photographic film to and between a cassette film holder and an exposure drum.

A further object of the invention is to provide new and improved means for handling photographic film for exposure on a drum in reproduction apparatus.

Still another object of the invention is to provide new and improved means for operating a film exposure drum.

A yet further object of the invention is to provide new and improved means for automatic film transfer between a holder and an exposure device avoiding any need for a darkroom for the purpose, thereby attaining substantial advantages in compactness and in simplification of the apparatus and more particularly the housing structure for photographic reproduction apparatus.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 3 is a schematic illustration of the assembly showing the same in the relationship of film transfer;

FIG. 4 is an enlarged fragmentary sectional elevational views illustrative of the relationship of the film supporting register pins during transfer of the film material relative to the recording drum;

FIG. 5 is a schematic illustration showing the assembly after transfer of the film to the drum and the drum now in normal operation;

FIG. 6 is a schematic view illustrating the relationship of means of the assembly during transfer of the film from the drum into the film holder or cassette; and FIG. 7 is an enlarged fragmentary longitudinal sectional view through one of the register pins on the drum.

According to the present invention, photographic film is readily transferred to and between a film holder and a recording or exposure drum in a manner which requires no manual handling of the film during transfer, but accomplishes the transfer automatically in a thoroughly lightproof manner. The film is transferred from the holder to the drum in one direction of rotation of the drum and is transferred from the drum to the holder during rotation of the drum in the opposite direction. Simple manual control of the operating mechanism is provided for.

Figure 1:
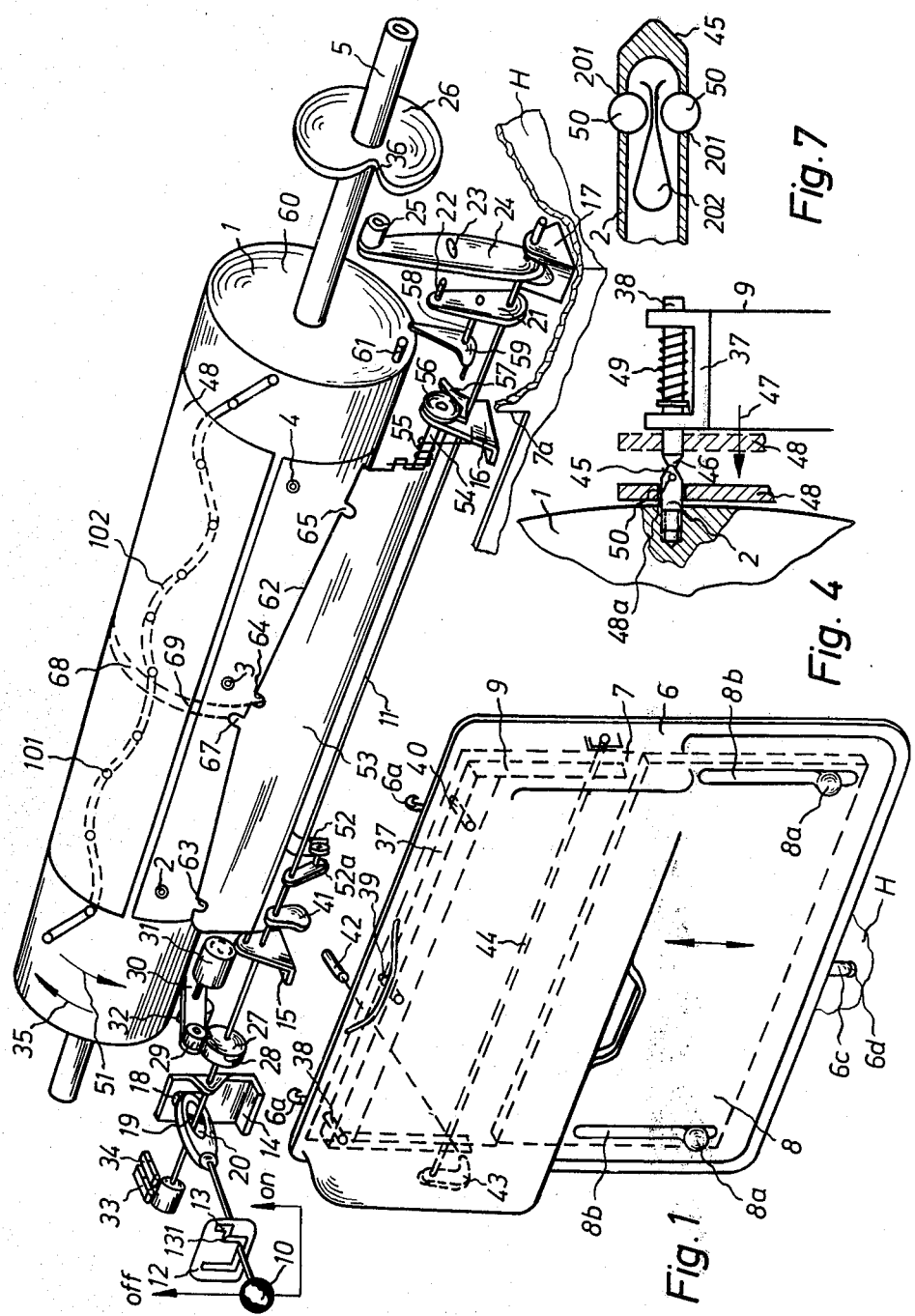
FIG. 1 is an exploded schematic view of an assembly embodying features of the invention.
Figure 2:
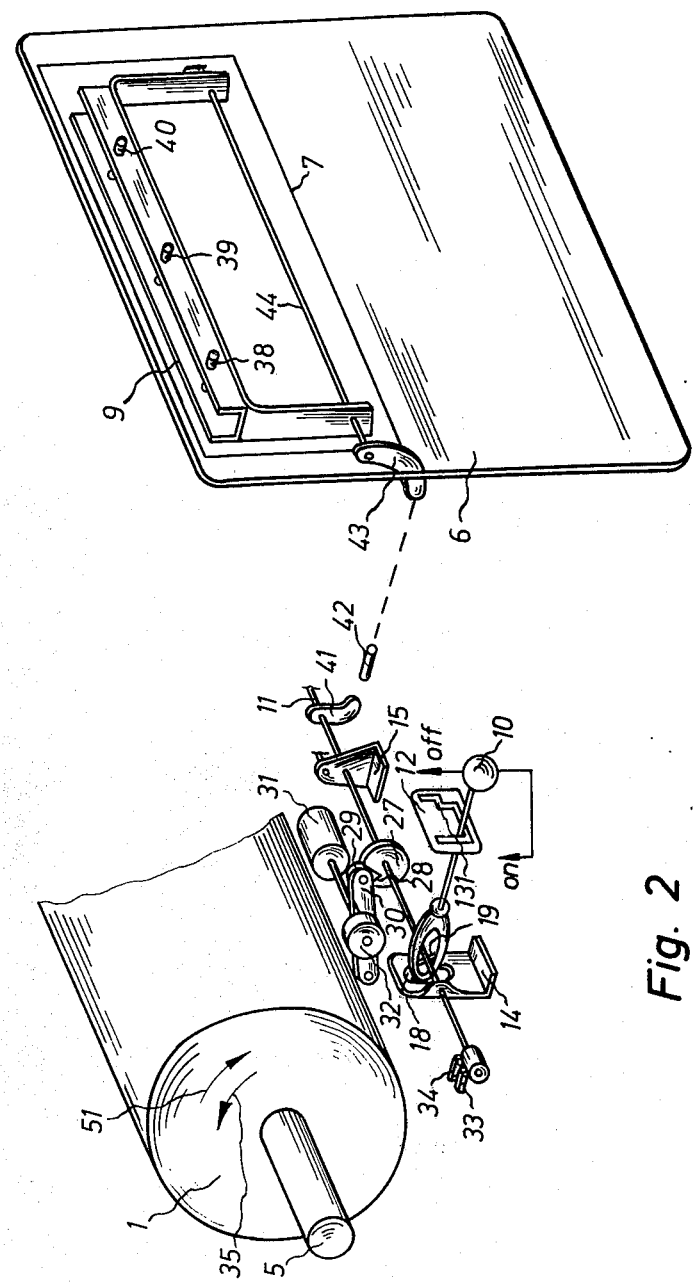
FIG. 2 is a fragmentary schematic exploded isometric view of the assembly viewed from another angle.

Having reference to the drawings, a photographic film recording or exposure drum 1 is depicted of an exposure apparatus which has not been shown in detail. Rotary mounting of the drum 1 is provided for by an axial shaft 5 which is suitably mounted within a normally lightproof housing H of the apparatus and which housing has been shown only fragmentarily and schematically for illustrative purposes (FIGS. 1 and 2). Means on the drum 1 for receiving and holding film material 48 accurately and firmly on the drum perimeter comprise supporting and registration means including a plurality of registration pins 2, 3 and 4 located in spaced relation along a longitudinal line on the drum perimeter to be received in registration holes 48 (FIG. 4) provided in a leading marginal portion of the film sheet. Although three of the registration pins have been shown, the number may be varied as preferred depending on the size of the drum and on the film width to be handled by the drum. In addition, the drum 1 is provided with vacuum film retaining means and for this purpose the shaft 5 is desirably hollow and connected in a suitable manner with a source of vacuum (not shown) which effects a negative pressure or vacuum in the drum so that the film, and more particularly the trailing end portion of the film 48 is sucked against the drum perimeter through suction holes 101 desirably provided in a zig-zag or wavy pattern alignment lengthwise of the drum which has a corresponding communicating internal groove 102. There may be as many sets of the suction holes 101 circumferentially spaced on the drum 1 as desired or necessary to hold the film 48 snugly wrapped on the drum in operation.

For handling of the film 48 before exposure, as well as after exposure, it is supported in a normally light-proof holder or cassette 6 which is constructed and arranged to be mounted on the housing H for transfer of the sheet of film 48 from the cassette onto the drum 1 and then after exposure transfer of the film from the drum to return it to the cassette for further handling such as development of the film. For this purpose, the cassette 6 has a face provided with an opening 7 (FIGS. 1 and 2) which in assembly with the housing H registers with a corresponding opening 7a in the housing, with a suitable lightproofing seal 7b (FIG. 3) between the margins of the cassette face and the housing about the openings assuring freedom from light leakage into the assembly. Any suitable means may be provided for quick releasable attachment of the cassette 6 to the housing H, such as hanger hooks 6a (FIGS. 1 and 3) on the upper margin of the cassette engageable with complementary hanger brackets or lugs 6b on the housing. Means such as detaining or latching finger or bolt 6c on the lower margin of the cassette is engageable with a retaining or keeper member 6d on the housing (FIG. 1). In the film loaded condition of the cassette 6, the access opening 7 therein is closed by means of a slide closure 8 provided with suitable means such as knobs 8a at its lower corners movable through clearance slots 8b in the cassette housing to manipulate the closure between closed and open positions as indicated by a directional arrow in FIG. 1 while the cassette is suspended on the housing H. Within the cassette 6 the film is supported on a mounting frame 9 (FIGS. 1 and 2) carrying registration pins 38, 39 and 40 complementary to the drum pins 2, 3 and 4, respectively, and on which the film 48 is mounted within the cassette by means of the holes 48 a through which the pins are received. Rockable mounting of the frame 9 to enable transfer of the film 48 to and between the drum and the cassette is effected by means of a shaft 44 carried within the cassette and supporting the frame in alignment with the opening 7.

After the cassette 6 has been suspended on the housing H with the openings 7 and 7a aligned, and the closure slide 8 opened to provide for communication through the cassette and housing openings, transfer of the film 48 from the cassette to the drum 1 is initiated by actuation of means accessible for manipulation outside of the housing H and in one desirable arrangement comprising a handle lever 10 extending through a guide plate 12 having therein an angular control slot as shown for guiding manipulations of the lever in actuating control means including a longitudinally and rotatably shiftable rod or shaft 11 supported by aligned bearing brackets 14, 15, 16 and 17 (FIG. 1) suitably mounted fixedly within the housing H to maintain the shaft in spaced parallel relation to the drum 1.

As shown in FIGS. 1 and 2, the lever 10 is located in a neutral horizontally extending portion of the control slot and the plate 12. To effect transfer of film from the cassette onto the drum 1, the handle lever 10 is shifted as shown by the directional arrow in the "on" direction to shift it to the right and upwardly into a vertical guidance portion 13 of the guide slot whereby to effect axially rightward shifting of the shaft 11 as well as rocking of the shaft in a clockwise direction as viewed in FIG. 1, and counterclockwise as viewed in FIG. 2. For this purpose, the inner end of the handle lever 10 is universally pivotally engaged in a recess 18 in the bracket 14 and the lever is coupled to the shaft 11 by means of a pin 19 extending across an eye 20 in the inner end portion of the lever.

As the shaft 11 shifts to the right, a radially extending lever arm 21 fixedly on the right-hand end portion of the shaft between the brackets 16 and 17 is correspondingly shifted to move a rightwardly extending coupling 10 on its distal end portion into an intermediate slot 23 in a lever 24 which is pivotally mounted in the bracket 17 on the axis of the shaft 11. Then, on rocking of the shaft 11 to the "on" position by action of the handle lever 10, the coupling through the arm 21 and pin 22 causes the lever 24 to rock correspondingly and carry as pin 25 on its distal end portion, projecting away from the drum 1, into edge cooperation with a cam disk 26 fixedly corotatably mounted on the drum shaft 5.

As the lever 10 is lifted in the "on" direction, the corresponding actuation of the shaft 11 also effects operation of drum driving means. To this end, the shaft 11 has fixedly corotative therewith a cam wheel 27 between the brackets 14 and 15 and which wheel has in its perimeter a notch 28 in which is engaged in the neutral position of the wheel a follower 29 on the distal end portion of a lever 30 which is pivotally mounted on a fixed pivot relative to the housing H at its opposite end and intermediately rotatively carries a friction wheel 32 which is driven by a motor 31. As the shaft 11 is shifted toward the right during the "on" movement of the handle lever 10, energizing of the motor 31 is effected by means of contacts 33 and 34 in a suitable electrical circuit with the motor. In such "on" movement, the cam roller or wheel 27 is rotated to move the follower 29 out of the notch 28 and swing the lever 30 toward the drum 1 so that the friction wheel 32 now driven by the motor 31 will engage the drum and drive the drum rotatably in the direction of the arrow 35.

As the drum starts to rotate in the direction of the arrow 35 (FIGS. 1 and 3), the follower pin 25 of the lever 24 riding on the cam edge of the disk 26 reaches a cam notch 36 into which it drops, thus permitting a further degree of clockwise rotation of the shaft 11 as viewed in FIG. 1 and counterclockwise as shown in FIG. 3 and during which movement the handle lever 10 is manually shifted to the limit of the slot control leg 13. Location of the cam notch 36 is indexed with respect to the registration pins 2, 3 and 4 on the drum so that such pins will be opposite the film-carrying frame 9 in such alignment that the upper part of the frame having the registration support bar 37 carrying the pins 38, 39 and 40 as, in effect, radial extensions of the registration pins 2, 3 and 4 of the drum can be moved to effect film transfer alignment of the drum and frame pins.

Means for rocking the frame 9 about its shaft 44 into the film transferring position relative to the drum 1 comprise a thrust arm lever 41 fixedly corotatably mounted on the shaft 11 in alignment with a reciprocable thrust pin 42 carried by the cassette 6. As the follower 25 drops into the cam notch 36, the lever arm 41 drives the pin 42 against a rock lever 43 fixedly corotatively mounted on the frame shaft 44 on which the frame 9 is fixedly rockably mounted. Thereby the frame 9 is rocked about the axis of the shaft 44 to tilt the frame outwardly from the cassette openings 7 in opposition to the bias of a return spring 91, as shown in FIG. 3, to place tips of the registration pins 38, 39 and 40 of the film mounting frame 9 into engagement with the tips of the registration pins 2, 3 and 4 of the drum, respectively. To assure firm, accurate engagement of the pins, the tips of the pins 2, 3 and 4 are conically tapered to dull points and engage in complementary recesses in tapered tips 46 of the pins 38, 39 and 40.

After the register pins have engaged in film transferring contact of the tips 45 and 46 as visualized in FIG. 4, continued movement of the frame 9 toward the drum 4, as indicated by directional arrow 47, effects transfer of the film 48 from the pins 38, 39 and 40 onto the pins 2, 3 and 4. For this purpose, the pins 38, 39 and 40 are reciprocably mounted on the frame bar 37 and are shifted against the bias of respective springs 49 retractably relative to the frame bar until the film 48 is pushed by the frame off of the pins 38, 39 and 40 onto the pins 2, 3 and 4.

Unintended release of the film 48 from the pins 2, 3 and 4 is prevented after transfer of the film thereto by detent means carried by these pins. In an advantageous construction as shown in FIGS. 4 and 7, showing the pin 2, the pins are hollow and have detent balls 50 arranged to project partially outwardly through aligned bores 201 of slightly smaller diameter than the diameter of the balls and through which these balls are normally biased by means of a spring 202. Thereby, after the film 48 has been moved from the supported relation on the pins 38, 39 and 40 as shown in dash outline in FIG. 4 to the full line position on the pins 2, 3 and 4, the frame 9 can be rocked back to its position within the cassette 6 and the film will be held against unintended displacement from the drum 1 on the pins 2, 3 and 4.

Return of the film mounting frame 9 into the cassette 6 under the bias of the return spring 91 occurs in response to shifting of the handle lever 10 into an intermediate dwell position in an angular portion 131 of the slot leg 13, whereupon the shaft 11 is rocked to release the lever arm 41 from the thrust pin 42 and thereby releasing the lever arm 43 so that the frame 9 is pulled back into the cassette by the spring 91. Further, this causes the pin 25 to leave the cam recess or notch 36. In the intermediate position 131, the friction wheel 32 is still pressed against the drum 1 so that it can continue rotation which was interrupted by engagement of the pin 25 in the notch 36. As the drum 1 continues rotating in the direction of the arrow 35, the film 48 now supported on the pins 2, 3 and 4 of the drum 1 is pulled out of the cassette 6 and wrapped about the perimeter of the drum, preferably by means (not shown) which presses the film against the surface of the drum. Such means may be associated with the vacuum holes 101.

After the film material 48 has been fully received upon the drum 1 the lever 10 is released to its neutral position in the guide slot in the plate 12, whereby the pin 22 is released from the lever 24 and the motor circuit contacts 33 and 34 are returned to the disconnect relation and the motor 31 deenergized. Hence, the neutral position of the transfer device, as shown in FIG. 5, will result, and the reproduction apparatus can take over for exposure of the film 48 carried by the drum which is now driven through the shaft 5 by means (not shown) of the apparatus.

After recording on the film has been completed, the film material 48 can be returned to the cassette 6 for transportation to a darkroom for development. For this purpose, after the drum 1 has been stopped at conclusion of the exposure process, the handle lever is shifted in the direction of the "off" arrow (FIGS. 1 and 6) wherein it engages in a left-hand vertical leg of the guide slot in the plate 12. This causes the shaft 11 to be shifted toward the left by virtue of the coupling pin 19, thereby the pair of control contacts 33 and 34 are actuated to control switches for the motor 31 to energize the motor in reverse to the direction in which it rotated during transfer of the film from the cassette to the drum. As the shaft 11 is rotated in the "off" movement of the hand lever 10, the pin 29 is lifted from the groove 28 of the cam wheel 27 so that the friction drive wheel 30 pressing against the drum 1 and driven by the motor 31 will drive the drum in the direction of the arrows 51 in FIG. 1. At the same time, a control stop 52 of a film stripping blade 53 is released from a depressor 52a carried by the shaft 11. Thereby the blade 53 can rock about the axis of a shaft 54 on which it is fixedly mounted and which is rotatably supported by and between the bearing brackets 15 and 16 parallel to the shaft 11. Initially as the shaft 11 is shifted axially and releases the depressor 52a from the stop arm 52, a releasable latch device holds the stripper blade 53 separated from the drum 1 and in opposition to bias of a torsion spring 55, the latch comprising a ratchet wheel 56 corotatable with the shaft 54 and normally latchingly engaged by a pawl 57. To release the latch pawl 57, the lever arm 21 carries a stud 58 on which there is mounted a latch release lever 59 shiftable in the axial movements of the shaft 11 into and out of operating relation to the latch pawl 57. As the handle lever 10 moves the shaft 11 toward the left, the release lever 59 is moved into operating alignment with the pawl 57. Rotation of the drum 1 in the direction of the arrow 51 carries an indexing stud 61 on its end nearest the release lever 59 into tripping engagement with the release lever immediately after the film retaining pins 2, 3 and 4 on the drum 1 having passed the stripper edge of the blade 53. Engagement of the stud 61 against the release lever 59 trips this lever and drives it into tripping, releasing engagement with the latch pawl 57 to release it from the ratchet wheel 56 so that the biasing spring 55 causes the blade 53 to swing on its shaft and engage the stripper edge 62 of the blade pressingly against the perimeter of the drum 1. To clear the pins 2, 3 and 4, the blade edge 62 has clearance notches 63, 64 and 65, respectively.

In order to assure stripping of the film 48 by engagement of the blade 53 between the unattached trailing edge of the reversely moving film member and the drum, the blade 62 is provided with a protuberance at or adjacent the central portion of the blade to engage in a groove 68 circumferentially in the drum and thereby engage under the end of the film at the point 69 and lift the same away from the drum. In order to facilitate the stripping action of the blade edge 62, such edge is preferably of generally V-shape converging toward the protuberance finger 67. As the drum 1 is rotated by the friction wheel 32 in the direction of the arrow 51, the stripper blade 53 guides the film 48 in return direction through the opening 7a in the housing H and the access opening 7 in the cassette and then when the retaining pins 2, 3 and 4 are reached, the blade strips the film from the pins past the yieldable detents 50 thereon and the film drops from the drum into the cassette, the pins moving freely and without interruption through the respective clearance notches 63, 64 and 65 in the blade edge. The drum can then be stopped by returning the handle lever 10 to its neutral position and thereby neutralizing the drum actuating and shifting mechanism until another cycle of operation is to be performed. The cassette 6 with the exposed film transferred back from the drum thereinto can then be closed by shifting the slide 8 into the closing position relative to the opening 7. Then the cassette 6 can be removed from the housing 8 for transportation of the film to a development station.

Instead of utilizing a manual operating control arrangement such as the handle lever 10, the various axial shiftings and rotary movements of the shaft 11 may be effected by means including actuating magnets or solenoids to accomplish the axial shifting of the shaft and an eccentric or a servo-motor for rotating the shaft.

Although minor modifications might be suggested by those versed in the art, it should be understood that I wish to embody within the scope of the patent warranted hereon all such modifications as reasonably and properly come within the scope of our contribution to the art.

I claim as my invention:

1. A device for handling photographic film between a cassette and an exposure reproduction apparatus:
    said cassette having a film passage access opening normally closed by a shiftable closure, and said apparatus including an enclosing housing having an access opening;
    said openings being registrable with the cassette mounted in closing relation to said opening in the housing;
    said cassette having therein a film supporting frame;
    said apparatus including an exposure drum within said housing;
    means including said frame for moving the film from the film supporting frame through the aligned openings into said housing toward said drum;
    film supporting structure on said frame and said drum cooperating for transfer of the film from the frame to the drum;
    said film supporting structure comprising film supporting and registration pins, with the pins of the frame being alignable with the pins on the drum; and
    means for transferring the film from the frame pins onto the drum pins.

2. In a device according to claim 1, said drum pins having detent means for retaining the film transferred thereto.

3. In a device according to claim 1, means for rotatably driving said drum for withdrawing the film from the frame pins and cassette in one direction and for returning the film to the cassette in the opposite direction.

4. In a device for handling photographic film for transfer to an exposure reproduction apparatus:
    a film holding cassette having an opening in one side adapted to be placed in registration with an access opening into a housing having exposure reproduction apparatus therein;
    a closure displaceable between open and closed positions relative to said cassette opening;
    a film support having opposite end portions;
    pivot means mounting one end portion of the support in the cassette and with the opposite end portion of the film support aligned with said cassette opening;
    means on said opposite end portion of the support for supporting engagement with a piece of film within the cassette, the film being intended for transfer to the exposure reproduction apparatus; and
    means for pivotally swinging said support on said pivot means to project said opposite end portion of the support through the cassette opening when said closure is in it's open position to thereby carry the film through said cassette opening and the aligned housing access opening for handling of the film by the reproduction apparatus.

5. In a device according to claim 4, means for driving the drum selectively in respective opposite rotary directions, one of said rotary directions being for continuing movement of the film from the support and cassette to the drum, and the other of said rotary direction being for transferring the film from the drum into the cassette.

6. A device according to claim 4, wherein said means for pivotally swinging comprise a cam mounted corotatable with the drum, means for rotating the drum and thereby the cam, and means actuated by said cam for effecting said swinging of the support.

7. A device according to claim 4, wherein said means on said opposite end portion of the support for supporting engagement with a piece of film comprise film supporting and registration pins, with the pins of the frame being alignable with complementary means of the exposure reproduction apparatus within the housing, and means for transferring the film from the pins to the complementary means within the housing.

8. A device according to claim 4, including means normally biasing said film support into the cassette.

9. A device for handling photographic film between a cassette and an exposure reproduction apparatus:
    said cassette having a film passage access opening normally closed by a shiftable closure, and said apparatus including an enclosing housing having an access opening;
    said openings being registrable with the cassette mounted in closing relation to said opening in the housing;
    said cassette having therein a film supporting frame;
    said apparatus including an exposure drum within said housing;
    means including said frame for moving the film from the film supporting frame through the aligned openings into said housing toward said drum;
    film supporting structure on said frame and said drum cooperating for transfer of the film from the frame to the drum;
    means including a rotatable and axially shiftable shaft;

an actuating handle lever coupled with the shaft for selectively rotating and axially shifting the shaft;

a guide plate having an angular guide slot therein through which said handle lever extends and by which selective axial and rotary movements of the shaft by actuation of the handle lever are determined; and means controlled by said shaft for effecting film movement shifting of said frame toward said drum and for driving said drum.

10. In a device according to claim 9, film stripping and transfer guiding means controlled by said shaft for effecting movement of the film from the drum into the cassette.

11. In a device according to claim 1, means pivotally mounting the frame for projection through said openings for moving film supported thereby into said housing, means normally biasing said frame into a retracted position in the cassette, means within the cassette for actuating said frame, and a motion transmission coupling between said actuating means and said frame for swinging said frame in opposition to said biasing means.

12. In a device for handling photographic film transferred from a cassette into an exposure reproduction apparatus including a drum within an enclosing housing:

the housing having an access opening aligned with the drum for registration of a cassette with the opening for transfer of a piece of film shorter than the diameter of the drum from the cassette onto the drum;

said drum being rotatably mounted within the housing;

film-engaging pins located at spaced longitudinal intervals in alignment on the perimeter of the drum and engageable in openings in an end margin of a film piece;

means for rotatably actuating the drum to align said pins with said openings to receive a film piece through said opening from a cassette and for then driving the drum rotatably to draw the film from the cassette unto the drum; and means for effecting transfer of film from the cassette coordinated in operation with rotatable actuation of the drum.

13. In a device according to claim 12, said pins being hollow and having lateral openings therein, and detents normally biased to project from said openings, said detents being displaceable inwardly relative to said pins on receiving the film piece thereon and acting thereafter to retain the film piece against unintentional displacement from the pins.

14. In a device according to claim 13, said pins on the drum having reduced diameter tips thereon, and a cassette carried film-holding support having pins complementary to the drum-carried pins projecting thereon for engagement with the film piece before transfer to the drum, said support pins having recessed tips engageable with the tips of the drum-carried pins to facilitate registration of the pins and transfer of the film from the support carried pins onto the drum-carried pins.

15. In a device according to claim 14, said support pins being normally biased into projecting relation to the support, and being retractable in opposition to their bias for displacement of the film therefrom onto the drum-carried pins.

16. In a device according to claim 12, suction means on the drum for holding the film piece to the perimeter of the drum with an edge of the film piece spaced from the edge of the margin engaged by said pins.

17. In a device according to claim 12, a stripper blade having an edge adapted to engage tangentially with the drum, said blade having notches therein for clearing said pins, means normally biasing the blade toward the drum, and releasable means for selectively holding the blade away from the drum in opposition to said biasing means.

18. In a device according to claim 12, a stripper blade having an edge for generally tangential engagement with said drum, said edge being of generally V-shape converging to a peak, a lead finger projection from said peak, and a circumferential groove in said drum into which said finger projection extends.

19. In a device for handling photographic film for transfer to an exposure reproduction apparatus:

a film holding cassette having an opening in one side adapted to be placed in registration with an opening in a reproduction apparatus housing access opening;

a displaceable closure for said cassette opening;

a film support and means pivotally mounting the support in alignment with said cassette opening;

means on said support for supporting engagement with a piece of film within the cassette for transfer to the exposure reproduction apparatus;

means for pivotally swinging said support carrying the film through said cassette opening when said closure is open;

said support comprising a frame;

biasing means normally retaining said frame within the cassette;

said means pivotally mounting the support frame comprising a shaft;

said means for moving the support frame including a rock lever on said shaft; and means for driving said rock lever to turn the shaft for rocking said support frame.

20. In a device according to claim 19, the combination with an exposure reproduction apparatus housing having an opening therethrough matching the cassette opening and means supporting the cassette on the housing with the openings in registration, means within the housing for supporting film for exposure, and means within the housing for actuating said driving means to effect rocking of said support frame through said openings toward said film supporting means within the housing for transfer of the film thereto.

21. A device for handling photographic film between a cassette and an exposure reproduction apparatus:

said cassette having a film passage access opening normally closed by a shiftable closure, and said apparatus including an enclosing housing having an access opening;

said openings being registrable with the cassette mounted in closing relation to said opening in the housing;

said cassette having therein a film supporting frame;

said apparatus including an exposure drum within said housing;

means including said frame for moving the film from the film supporting frame through the aligned openings into said housing toward said drum;

film supporting structure on said frame and said drum cooperating for transfer of the film from the frame to the drum; and air suction holes arranged in said drum in zigzag pattern grooves extending along the drum.

22. A device for handling photographic film between a cassette and an exposure reproduction apparatus:

said cassette having a film passage access opening normally closed by a shiftable closure, and said apparatus including an enclosing housing having an access opening;

said openings being registrable with the cassette mounted in closing relation to said opening in the housing;

said cassette having therein a film supporting frame;

said apparatus including an exposure drum within said housing;

means including said frame for moving the film from the film supporting frame through the aligned openings into said housing toward said drum;

film supporting structure on said frame and said drum cooperating for transfer of the film from the frame to the drum;

means for rotatably driving said drum for withdrawing the film from the frame and the cassette in one direction and for returning the film to the cassette in the opposite direction; and stripper blade means operative to effect stripping of the film from the drum and guiding of the film for transfer from the drum into the cassette.

* * * * *